United States Patent [19]
Palazzolo

[11] Patent Number: 5,617,768
[45] Date of Patent: Apr. 8, 1997

[54] TRIMMER FOR REMOVING SCRAPING FROM TOPS OF PLASTIC BOTTLES

[75] Inventor: Robert J. Palazzolo, Williamston, Mich.

[73] Assignee: M.C. Molds Inc., Williamston, Mich.

[21] Appl. No.: 439,313

[22] Filed: May 11, 1995

[51] Int. Cl.⁶ .......................... B23B 5/14; B23D 25/00; B23D 31/04
[52] U.S. Cl. .................... 82/47; 82/101; 82/46
[58] Field of Search ............................... 82/46, 47, 51, 82/53, 101

[56] References Cited

U.S. PATENT DOCUMENTS

| | | |
|---|---|---|
| 3,352,404 | 11/1967 | Settembrini . |
| 3,429,211 | 2/1969 | Pelot . |
| 3,541,905 | 11/1970 | Mey ............................................. 82/47 |
| 3,675,521 | 7/1972 | Ziegler ...................................... 82/101 |
| 3,728,063 | 4/1973 | Langecker . |
| 3,800,638 | 4/1974 | Duikers et al. . |
| 3,886,824 | 6/1975 | Michel et al. ............................. 82/47 |
| 3,894,454 | 7/1975 | Reilly et al. . |
| 3,962,938 | 6/1976 | Reilly et al. . |
| 3,967,516 | 7/1976 | Griesing et al. ......................... 82/47 |
| 4,445,406 | 5/1984 | Thatcher . |
| 4,614,018 | 9/1986 | Krall ....................................... 29/33 J |
| 4,876,930 | 10/1989 | Thatcher . |
| 5,257,560 | 11/1993 | Palazzolo ................................. 82/46 |

*Primary Examiner*—M. Rachuba
*Assistant Examiner*—Kenneth S. Hansen
*Attorney, Agent, or Firm*—Ian C. McLeod; Mary M. Moyne

[57] ABSTRACT

A trimming apparatus (10) for removing the dome scrap (152) from a blow, molded bottle (150) is described. The apparatus includes an advancement wheel (12) and a rotation wheel (14) mounted on opposite sides of a path (16) formed by upper guide rails (18 and 20), lower guide rails (22 and 24) and the wheels. A knife assembly (62) is adjustably mounted beneath the advancement wheel and includes a knife blade (64) which extends into the path slightly in front of the area tangent to the wheels. The wheels are connected to drive motors (26 and 28). In use, the bottle is fed into the path such that the upper guide rails engage each side of the groove (152A) of the dome scrap. As the bottle moves into the apparatus, the advancement wheel engages the groove to move the bottle into the path between the wheels. When the bottle reaches the area of the path tangent to the wheels, the rotation wheel contacts the groove. The wheels are rotating in the same direction such that the wheels contact opposite sides of the groove in different directions thus, acting together to rotate the bottle. As the bottle rotates, the knife blade contacts the notch (150A) of the bottle and severs the dome scrap.

30 Claims, 4 Drawing Sheets

TRIMMER FOR REMOVING SCRAPING FROM TOPS OF PLASTIC BOTTLES

BACKGROUND OF THE INVENTION (1) Field of the Invention

The present invention relates to an improved trimming apparatus for a blow molded container. In particular, the present invention relates to a trimming apparatus for removing an upper dome scrap from a blow molded plastic container, such as a plastic bottle. The conventional blow molding machines produce a blow molded plastic bottle having dome scrap which extends above the opening of the bottle. The dome scrap must be removed in such a way as to provide a smooth, clean cut opening on the bottle.

(2) Description of Related Art

The related art shows several apparatus for trimming bottles which use rotation of the bottle. Illustrative are U.S. Pat. No. 3,429,211 to Pelot and U.S. Pat. Nos. 4,445,406 and 4,876,930 both to Thatcher.

Several related art trimming apparatus have rotating devices such as a rotating wheel or a turret that rotates a hollow, plastic bottle in an arcuate path past a stationary knife edge to trim dome scrap from the bottle. This type of device is illustrated in U.S. Pat. No. 3,675,521 to Ziegler; U.S. Pat. No. 3,800,638 to Duikers et al; U.S. Pat. Nos. 3,894,454 and 3,962,938 both to Reilly et al; U.S. Pat. No. 3,886,824 to Michel et al; U.S. Pat. No. 3,967,516 to Griesing et al and U.S. Pat. No. 4,614,018 to Krall. In particular Griesing et al describes a trimming apparatus having a rotating wheel that moves the bottle in an arcuate path along a fixed guide while a rotating blade trims the dome scrap from the bottle.

In addition, Reilly et al ('454) shows an apparatus for deflashing thermoplastic articles. In operation, the untrimmed preforms are dropped at the inlet end of the apparatus and are supported by their hot moil portions between the screw conveyor and the adjacent support. The screw conveyor keeps the hot preforms spaced apart as it sequentially advances the preforms toward the deflashing station. The preforms rotate about their vertical axes as they move. The preforms are passed into the moil cutting pattern in the deflashing station where they are rollingly engaged by a wheel which urges the moil portion into and against the knife edge so as to slice through the plastic in a substantially lateral direction. The cutting surface has the same arcuate shape as the wheel. The unsupported, trimmed preforms fall by gravity in through a tapering funnel on and to a carrier assembly. Reilly et al ('938) shows a similar apparatus.

These trimmer apparatus tend to be extremely complicated, which can translate into substantial down time for a production line if a part of the apparatus malfunctions.

Other types of trimming and cutting apparatus are shown by U.S. Pat. No. 3,541,905 to Mey; U.S. Pat. No. 3,728,063 to Langecker and U.S. Pat. No. 3,352,404 to Settembrini. Mey describes a device for radially cutting tubular workpieces to form piston rings or cylinder liner blanks, and the like. Langecker describes an apparatus that removes neck waste from a hollow plastic bottle with a striker operated by a piston-cylinder mechanism. Settembrini is only generally related to the present invention and describes an air-pervious conveyor belt for maintaining a plastic bottle on a conveyor belt in a stable position.

My U.S. Pat. No. 5,257,560 describes a trimmer for removing scrap from the tops of plastic bottles. The trimmer uses a pair of rotating belts which create a path through the apparatus and which move and spin the bottle along the path of the trimmer. As the bottle moves and spins along the path between the belts, the bottle moves past a stationary knife which cuts and removes the dome scrap of the bottle.

There remains a need for a trimmer apparatus for blow molded, plastic bottles that is relatively simple in construction and which rotates the bottle adjacent the knife which removes the dome scrap from the bottle as the bottle moves down a longitudinal path through the trimmer apparatus.

SUMMARY OF INVENTION

The trimming apparatus of the present invention is comprised of a pair of rotating drive wheels mounted above and on opposite sides of a path through the apparatus. Preferably, the bottle is placed on a conveyor in an upstanding position, upstream from the trimming apparatus and the conveyor feeds the bottle into guide rails forming the path. The guide rails engage an annular groove provided on the dome scrap. The guide rails help to keep the bottle in the upstanding position with the longitudinal axis of the bottle aligned along the vertical until the dome scrap is contacted by the rotating wheels. The wheels engage the dome scrap in the groove and serve to rotate the bottle while moving the bottle through the trimming apparatus. A knife is horizontally mounted below the wheels at a height that corresponds to a notch provided at the base of the dome scrap. The knife point projects into the neck of the bottle cutting into the notch to remove the dome scrap from the bottle.

The wheels are controlled by a pair of drive motors which rotate the wheels in a similar direction so that the wheels move in opposite directions on either side of the groove in the dome scrap of the bottle. Thus, one of the wheels is moving in a forward direction corresponding to the direction of travel of the bottle moving through the trimming apparatus on one side of the groove while the other wheel moves in a backwards direction on the opposite side of the groove. This provides for rotating the bottle. The forward moving wheel is rotating at a slightly faster rate than the other wheel, which causes the bottle to advance through the trimming apparatus while at the same time rotating on its vertical axis.

OBJECTS

It is therefore an object of the present invention to provide an improved trimmer apparatus for removing dome scrap from a hollow, plastic bottle which rotates the bottle as the bottle moves past a knife edge along a linear path through the trimmer apparatus to remove the dome scrap from the bottle. Further, it is an object of the present invention to provide an improved trimmer apparatus which has a pair of wheels that contact opposite sides of the dome scrap of a plastic bottle to advance the bottle along a linear path and to rotate the bottle as the bottle moves past a knife edge which removes the dome scrap from the bottle. Still further, it is an object of the present invention to provide an improved trimmer apparatus for removing dome scrap from a hollow, plastic bottle that is comprised of a pair of wheels which have different linear rates of travel such that the bottle rotates as it moves past a knife edge which removes the dome scrap from the bottle. Further, it is an object of the present invention to provide a trimmer apparatus which is relatively uncomplicated but reliable and can be adjusted to provide for various shapes and diameters of bottles and for different types and shapes of dome scrap. Finally, it is an object of the present invention to provide a trimmer apparatus that is relatively inexpensive to build, easy to operate and is a portable apparatus that can be quickly moved to a position downstream of a blow molding machine for trimming the dome scrap from hollow, plastic bottles produced by the blow molding machine. These and other objects will become increasingly apparent by reference to the following descriptions and to the drawings.

DETAILED DESCRIPTION OF THE PREFERRED EMBODIMENTS

The present invention relates to a trimmer apparatus for removing a dome scrap from a blow molded, plastic container, which comprises: a frame defining a path through the apparatus; a pair of opposed circular drive wheels positioned along the path on opposite sides of the path in a common plane, wherein each of the drive wheels is connected to a drive means mounted on the frame for rotating the drive wheels in the same directions and wherein the drive wheels acting together provide for rotating the container about a longitudinal axis of the container and for moving the dome scrap or container along the path after the dome scrap is removed; and a cutting means mounted adjacent at least one of the drive wheels with a cutting edge of the cutting means projecting into the path adjacent the longitudinal axis, away from the drive wheel to provide for cutting the dome scrap from the container as the container is rotated on the longitudinal axis in the path between the drive wheels so that the container or the dome scrap falls away from the path.

The present invention further relates to a trimmer apparatus for removing a dome scrap from a blow molded, plastic container, which comprises: a frame defining a path through the apparatus; a first circular drive wheel positioned along the path, wherein the first drive wheel has a drive means mounted on the frame for moving the first drive wheel; a second circular drive wheel positioned along the path, wherein the second drive wheel is connected to a drive means which provides for rotating the second drive wheel and wherein the second drive wheel in conjunction with the first drive wheel provides for rotating the container about a longitudinal axis of the container while the container is in contact with the drive wheels; and a cutting means mounted adjacent at least one of the first or the second drive wheels with a cutting edge of the cutting means projecting into the path, adjacent the longitudinal axis away from the first or second drive wheel to provide for cutting the dome scrap from the container as the container is rotated between the first and second drive wheels to remove the dome scrap.

Further, the present invention relates to a method for removing dome scrap from a plastic container which comprises: providing a trimmer apparatus for removing a dome scrap from a blow molded, plastic container, which comprises: a frame defining a path through the apparatus; a pair of opposed circular drive wheels positioned along the path on opposite sides of the path in a common plane, wherein each of the drive wheels is connected to a drive means mounted on the frame for rotating the drive wheels in the same directions and wherein the drive wheels acting together provide for rotating the container about a longitudinal axis of the container and for moving the dome scrap or container along the path after the dome scrap is removed; and a cutting means mounted adjacent at least one of the drive wheels with a cutting edge of the cutting means projecting into the path adjacent the longitudinal axis, away from the drive wheel to provide for cutting the dome scrap from the container as the container is rotated on the longitudinal axis in the path between the drive wheels so that the container or the dome scrap falls away from the path; feeding the container into the path so that the container moves along the path and the dome scrap is removed; and removing the dome scrap and the container from the apparatus.

Figure 1:
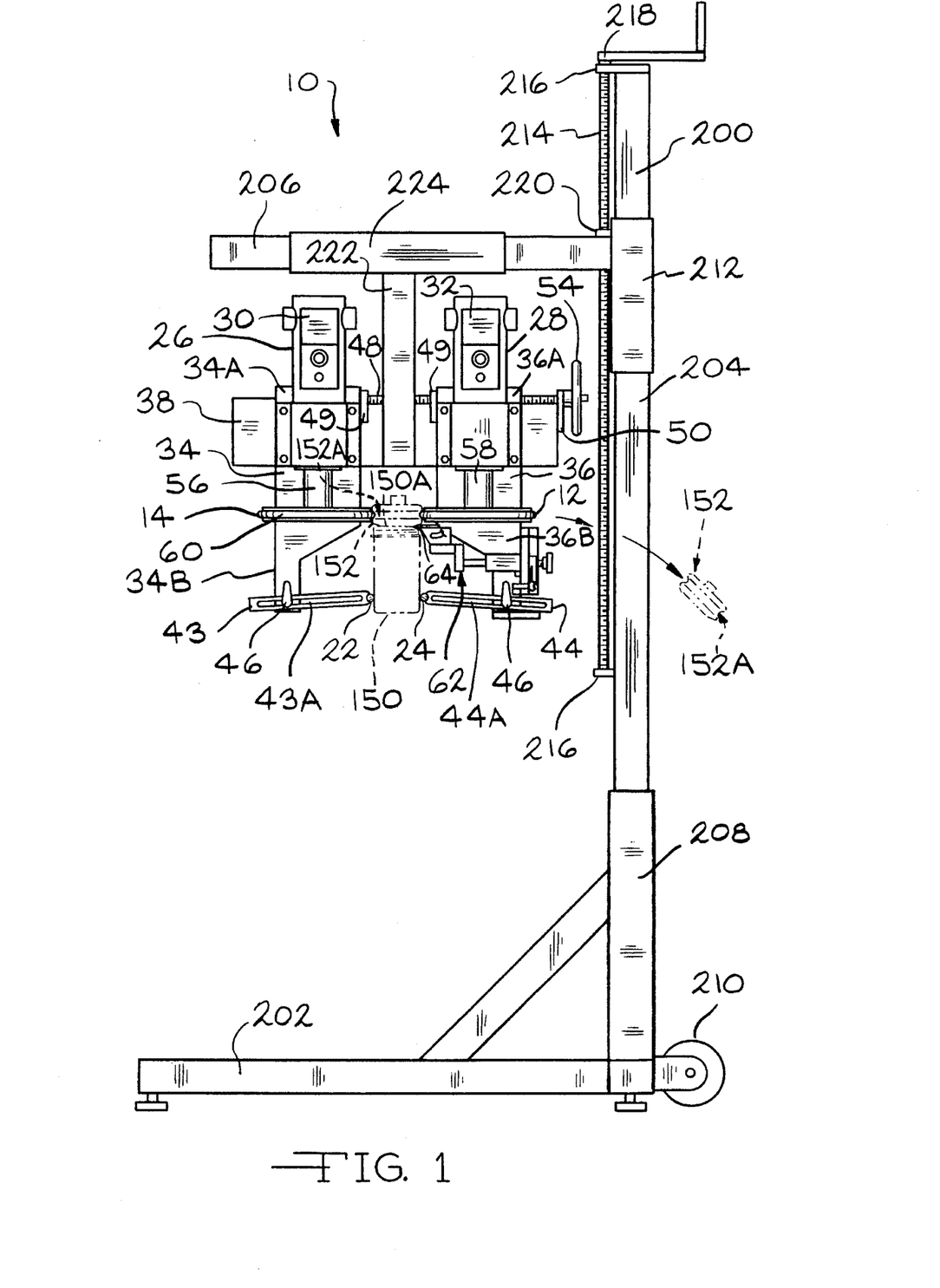
FIG. 1 is a front view of the apparatus 10 without the exit guide rail 112 showing the groove 152A of the dome scrap 152 of the bottle 150 between the two wheels 12 and 14.

FIGS. 1 to 5 show the improved trimmer apparatus 10 of the present invention for removing a dome scrap 152 from a blow molded, plastic bottle 150. The trimmer apparatus 10 is supported on a frame 200 which is mounted on a base 202 and which has a vertical frame member 204 onto which is mounted an adjustable horizontal frame member 206 (FIG. 1). In the preferred embodiment, the base 202 is a conventional base having a hollow, receiving member 208 for receiving the bottom of the vertical frame member 204. The base 202 is preferably provided with rollers 210 or casters for moving the trimmer apparatus 10 from one trimming station (not shown) to another. Preferably, the trimming station is adjacent the outlet of a plastic, blow molding machine (not shown). The horizontal frame member 206 is preferably adjustable along the length of the vertical frame member 204 and is mounted on the vertical frame member 204 by a sleeve 212 which mounts around the vertical frame member 204. The sleeve 212 preferably has a central opening (not shown) slightly larger than the vertical frame member 204 in order to enable the sleeve 212 to easily move up and down the vertical frame member 204. The horizontal frame member 206 is adjustable by means of a threaded rod 214 which extends from the top of the vertical frame member 204 to the bottom of the vertical frame member 204 just above the base 202. The rod 214 is secured at each end of the vertical frame member 204 by a pair of bushings 216. The end of the rod 214 adjacent the top of the vertical frame member 204 is provided with a handle 218 which allows for easy rotation of the rod 214 and thus, easy vertical adjustability of the trimming apparatus 10. The rod 214 extends through the horizontal frame member 206 and through a nut 220 mounted on the top of the horizontal frame member 206 adjacent the vertical frame member 204. The nut 220 enables the horizontal frame member 206 to move up and down the threaded rod 214 as the rod 214 is rotated. In an alternate embodiment, a horizontal bar (not shown) is mounted on the vertical frame member 204 below the horizontal frame member 206 and is provided with a guide plate (not shown) at the end opposite the vertical frame member 204 (to be described in detail hereinafter). Preferably, the horizontal bar is mounted to the vertical frame member 204 by a nut and bolt assembly (not shown) which extends through a sleeve (not shown) mounted over the vertical frame member 204. The vertical frame member 204 can be provided with several holes (not shown) which allow the horizontal bar to be adjusted to several positions.

A vertical support bar 222 is slidably mounted between the ends of the horizontal frame member 206 and extends downward, perpendicular to the horizontal frame member 206. The vertical support bar 222 is slidably mounted onto the horizontal frame member 206 by a sleeve 224. The sleeve 224 allows the vertical support bar 222 to be adjustable along the length of the horizontal frame member 206. The trimming apparatus 10 is mounted at the end of the vertical support bar 222 opposite the horizontal frame member 206 (FIG. 1). The apparatus 10 is mounted onto the support bar 222 by an angle brace (not shown). One leg of the angle brace is mounted onto the end of the vertical support bar 222 while the other leg of the brace is removably mounted to a back plate 38 of the apparatus 10 by means of a pair of nut and bolt assemblies (not shown). In the preferred embodiment, the frame 200 and the frame members 204 and 206 are constructed of square, tubular steel. However, other materials and shapes could also be used. The sleeves 212 and 224 are preferably mounted to the horizontal frame member 206 and the vertical support bar 222, although, any means of permanently mounting the parts together can be used.

Figure 3:
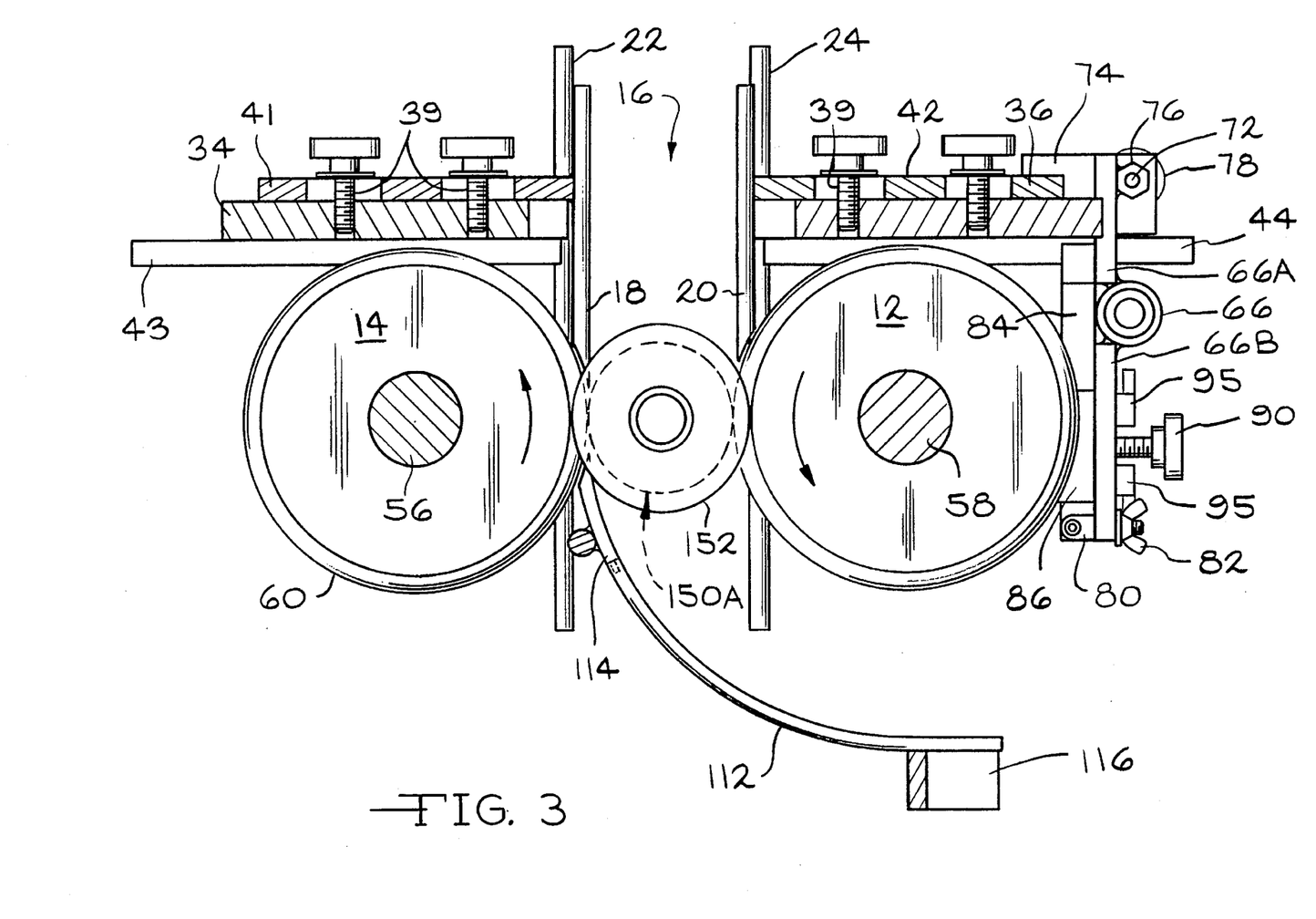
FIG. 3 is an enlarged partial cross-sectional top view above the wheels 12 and 14 showing the guide rails 18, 20, 22 and 24, the exit guide rail 112 and the wheels 12 and 14 rotating in the same direction.

As shown in FIGS. 1 and 3, the trimming apparatus 10 includes an advancement wheel 12 and a rotation wheel 14. The wheels 12 and 14 are mounted on opposite sides of a path 16 formed by the wheels 12 and 14 and by left and right upper guide rails 18 and 20 and left and right lower guide rails 22 and 24. In the preferred embodiment, the rotation wheel 14 is mounted on the left side of the path 16 as seen from the front or exit side of the apparatus 10, and the advancement wheel 12 is mounted on the right side of the path 16 (FIG. 1). The wheels 12 and 14 are rotated by left and right drive motors 26 and 28 which are controlled by left and right control boxes 30 and 32. The drive motors 26 and 28 are mounted onto left and right mounting plates 34 and 36, respectively, which are slidably mounted onto opposite ends of a back plate 38 having the vertical support bar 222 positioned therebetween. The mounting plates 34 and 36 preferably have notches (not shown) adjacent the back plate 38 into which the back plate 38 is mounted. This allows for more secure mounting of the mounting plates 34 and 36 on the back plate 38. The back plate 38 is provided with a pair of slots (not shown) adjacent each of the mounting plates 34 and 36 into which adjustment bolts (not shown) are mounted (FIG. 3). A pair of gibs 40 (one shown) are mounted onto the top of the back plate 38 adjacent each of the mounting plates 34 and 36. The gibs 41 are secured to the mounting plates 34 and 36 by nut and bolt assemblies (not shown) and help to secure the mounting plates 34 and 36 onto the back plates 38. A threaded adjustment rod 48 for moving the mounting plates 34 and 36 extends parallel to the mounting plates 34 and 36 behind the vertical support bar 222 and through a pair of left and right hand threaded holders 49 one positioned on each of the mounting plates 34 and 36. The adjustment rod 48 also extends through an unthreaded support holder 50 which is mounted on one of the plates 34 or 36. The support holder 50 prevents extraneous side to side movement of the rod 48. The threaded rod 48 is provided with a handle 54 at the end of the rod 48 adjacent the support holder 50. The handle 54 and the support holder 50 could be located adjacent either drive motor 26 or 28. The holders 49 are preferably threaded and positioned such that rotating the handle 54 simultaneously moves both mounting plates 34 and 36 with the drive motors 26 and 28 either together or apart. The slots in the back plate 38 enable the mounting plates 34 and 36 to be adjusted horizontally on the back plate 38 thus, allowing the distance between the drive motors 26 and 28 and thus the width of the path 16 between the wheels 12 and 14 to be adjusted.

The mounting plates 34 and 36 preferably have a rectangular upper portion 34A and 36A and a cutaway lower portion 34B and 36B. The cutaway lower portion 34B and 36B of the mounting plates 34 and 36 prevents the plates 34 and 36 from interfering with the bottle 150 as the bottle 150 is moved along the path 16 into the apparatus 10. This is especially important where the bottle 150 has a small neck and a large body. The upper guide rails 18 and 20 and the lower guide rails 22 and 24 are mounted on the upper portion 34A and 36A and lower portion 34B and 36B, respectively, of the mounting plates 34 and 36. The upper guide rails 18 and 20 are mounted horizontally and parallel to each other. The lower guide rails 22 and 24 are also mounted horizontally, parallel to each other (FIG. 3).

The upper guide rails 18 and 20 are mounted onto position bars 41 and 42 which are rectangular in shape with one end tapering to a point. The position bars 41 and 42 are mounted onto the upper portion 34A and 36 of the mounting plates 34 and 36A by adjustment bolts 39. The upper guide rails 18 and 20 are preferably mounted onto the tapered end of the position bars 41 and 42 such that the position bar 41 or 42 does not interfere with the guide rail 18 or 20. Preferably, the upper guide rails 18 and 20 are mounted at the same height as the outer circumference of the wheels 12 and 14 such that the rails 18 and 20 form the entrance of the path 16 leading between the wheels 12 and 14. Preferably, the upper guide rails 18 and 20 have a cylindrical shape and have a length such as to extend outward beyond the position bars 41 and 42 away from the wheels 12 and 14 and to extend inward toward the wheels 12 and 14. The ends of the rails 18 and 20 adjacent the wheels 12 and 14 are preferably tapered on the side adjacent the wheels 12 and 14 such that the bottle 150 can be smoothly transferred from contact with the guide rails 18 and 20 to contact with the rotating wheels 12 and 14. In the preferred embodiment, the left upper guide rail 18, adjacent the rotation wheel 14, is slightly longer than the right upper guide rail 20 adjacent the advancement wheel 12 (FIG. 3). This added length enables the advancement wheel 12 to engage and move the bottle 150 into the trimming apparatus 10 before the rotation wheel 14 engages the bottle 150 and causes the bottle 150 to rotate. Preferably, the left upper guide rail 18 adjacent the rotation wheel 14 extends inward to a point just before the point in the path 16 where the bottle 150 is tangent to both wheels 12 and 14. Thus, the rotation wheel 14 engages the bottle 150 just before the knife blade 64 contacts the bottle 150. In the preferred embodiment, the wheels 12 and 14 have a 7 inch (17.8 cm) diameter. Preferably, with a wheel diameter of 7 inches, the rotation wheel 14 is only in contact with the bottle 150 for approximately about 1 inch (2.54 cm) of the diameter of the wheel 14. The upper guide rails 18 and 20 are preferably spaced apart a distance equal to or slightly wider than the diameter of the groove 152A of the dome scrap 152 of the bottle 150. Thus, the bottle 150 is easily moved along and through the entrance of the linear path 16 but does not have substantial extraneous side to side movement between the rails 18 and 20 as it moves along the path 16. In the preferred embodiment, the wheels 12 and 14 are spaced apart a distance slightly less than the diameter of the groove 152A of the dome scrap 152 such that the path 16 between the wheels 12 and 14 has a width slightly smaller than the diameter of the groove 152A so that when the bottle 150 enters the path 16 between the wheels 12 and 14, the groove 152A of the dome scrap 152 is squeezed slightly such as to cause the diameter of the groove 152A of the dome scrap 152 and consequently, the shape of the notch 150A of the bottle 150 to become elliptical. The slight squeezing of the dome scrap 152 allows the wheels 12 and 14 to have a better grip on the bottle 150 which prevents slipping and which creates a cleaner, quicker cut. The elliptical shape of the notch 150A enables the knife blade 64 to cut into the notch 150A along the flatter surface which is created along the longer sides of the elliptical notch 150A. In the preferred embodiment, the knife assembly 62 is positioned such that the knife blade 64 makes contact with the long side of the elliptical notch 150A of the bottle 150. A flatter surface of the notch 150A allows for a smooth and cleaner cut by the knife blade 64 when removing the dome scrap 152.

The lower guide rails 22 and 24 only generally position the bottle 150 and are spaced apart such as to only come in contact with the bottle 150 if the bottle 150 is wobbling or tipping away from the vertical. The lower guide rails 22 and 24 preferably have a cylindrical shape and are mounted at one end of a pair of slot bars 43 and 44. The slot bars 43 and 44 have a central slot 43A and 44A along the entire length of the bars 43 and 44. The slot bars 43 and 44 are mounted onto the end of the lower portion 34B and 36B of the mounting plates 34 and 36 on the side opposite the back plate 38. The slot bars 43 and 44 are mounted by means of adjustment bolts 46 which extend through the mounting plates 34 and 36 and through the slots 43A and 44A of the slot bars 43 and 44. The slots 43A and 44A enable the slot bars 43 and 44 to be positioned on the mounting plates 34 and 36 anywhere along their length which allows the lower guide rails 22 and 24 to be moved horizontally and vertically toward and away from the path 16.

Figures 2, 6:
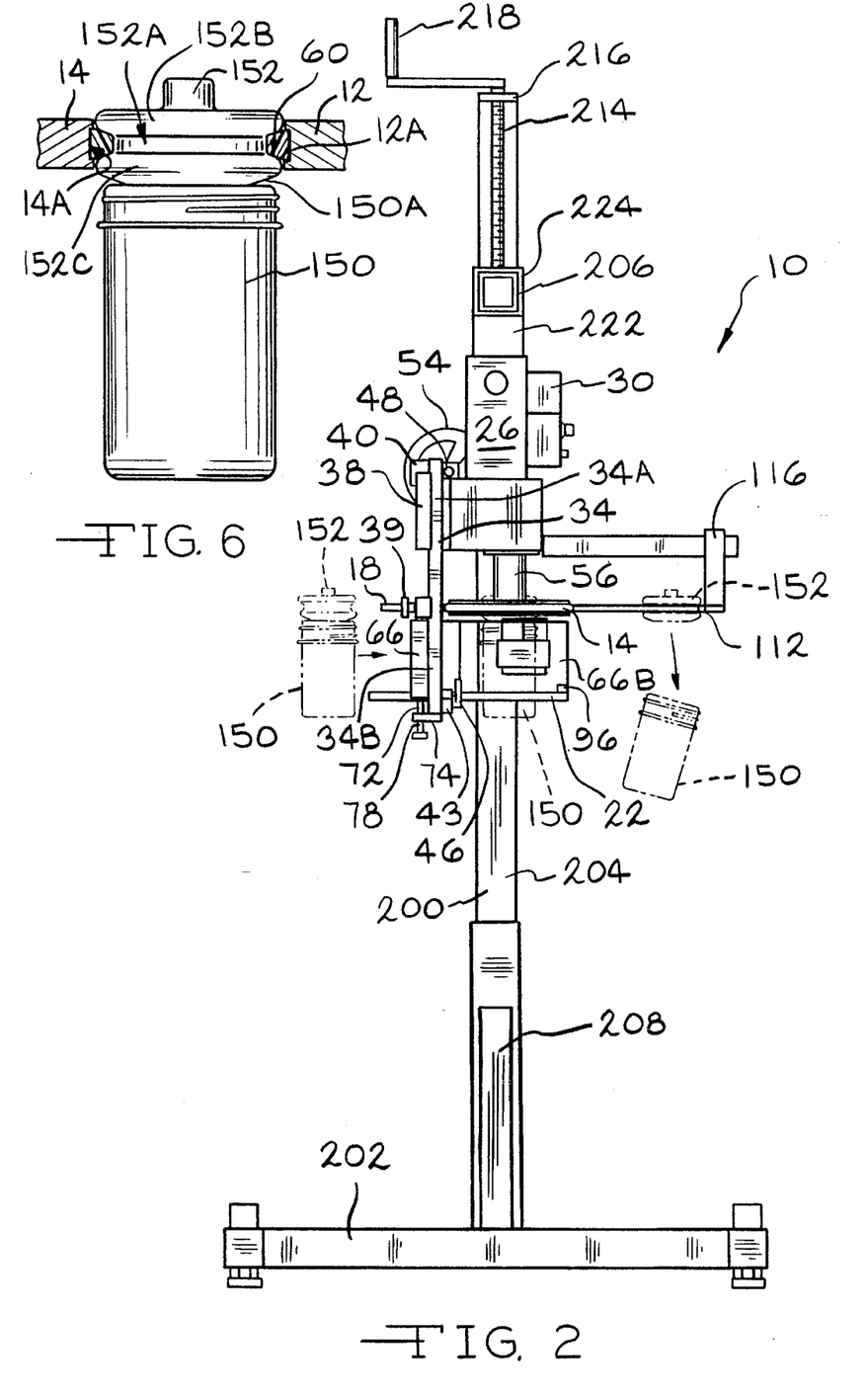
FIG. 2 is a left side view of the apparatus 10 showing the bottle 150 entering the apparatus 10 and exiting the apparatus 10 with the dome scrap 152 removed.
FIG. 6 is a partial front view of an alternate embodiment showing the covering 60 of the wheels 12 and 14 in the groove 152A of the dome scrap 152.

As shown in FIG. 1, the drive motors 26 and 28 are mounted to the mounting plates 34 and 36 on the side opposite the back plate 38. The drive motors 26 and 28 are preferably ⅛ HP 167 RPM DC Motors which are manufactured by W. W. Grainger, located in Chicago, Ill. The wheels 12 and 14 are mounted directly onto the shafts 56 and 58 of the drive motors 26 and 28. The wheels 12 and 14 are located on either side of the path 16; however, due to the different lengths of the upper guide rails 18 and 20, the rails 18 and 20 must remain with their respective wheel 12 or 14. In the preferred embodiment, the wheels 12 and 14 are identical and have the same diameter. The outer circumference of the wheels 12 and 14 can be provided with a covering 60. The shape of the covering 60 can vary in order to adjust to the different shapes and sizes of the grooves 152A of the dome scrap 152 for various types of bottles 150. The outer surface of the covering 60 can also be varied in order to allow for more or less friction between the wheel covering 60 and the groove 152A of the dome scrap 152. The outer surface of the circumference of the wheels 12 and 14 are preferably provided with a groove 12A and 14A or indentation which allows for a closer fit of the covering 60 on the wheels 12 and 14 and which allows for a more secure mounting of the covering 60 around the circumference of the wheels 12 and 14. Alternatively, the wheels 12 and 14 can be used without a covering 60. In this instance, the outer surface of the wheels 12 and 14 around the circumference would be shaped to fit the shape of the groove 152A of the dome scrap 152. In addition, the outer surface can be made abrasive such as having notches or smooth, whichever is needed for the most efficient performance of the apparatus 10. In the preferred embodiment, the outer surface of the wheels 12 and 14 or alternately, the outer surface of the coverings 60 have an arcuate, rounded shape. In an alternate embodiment as shown in FIG. 6, the coverings 60 or the outer surface of the wheels 12 and 14 can have a triangular, truncated shape which matches the triangular, angled shape of the groove 152A of the dome scrap 152. The diameter and thickness of the wheels 12 and 14 can be varied depending on the width and depth of the groove 152A of the dome scrap 152 and the diameter of the circumference of the groove 152A of the dome scrap 152. The covering 60 can be constructed of any material; however, a flexible hard material such as plastic is preferred. The wheels 12 and 14 are preferably constructed of steel or aluminum although, other materials could also be used.

The speed of rotation of the wheels 12 and 14 is controlled by the control boxes 30 and 32 of the drive motors 26 and 28. Each of the motors 26 and 28 has a separate control box 30 and 32 which allows for varying the speed of the motors 26 and 28 independently from each other. The control boxes 30 and 32 are preferably DC Drive such as the Model #5X412D sold by W. W. Grainger, located in Chicago, Ill. The control boxes 30 and 32 are mounted onto the respective motors 26 and 28 by mounting blocks (not shown) which are secured onto the drive motors 26 and 28 on the side opposite the mounting plates 34 and 36.

Figure 4:
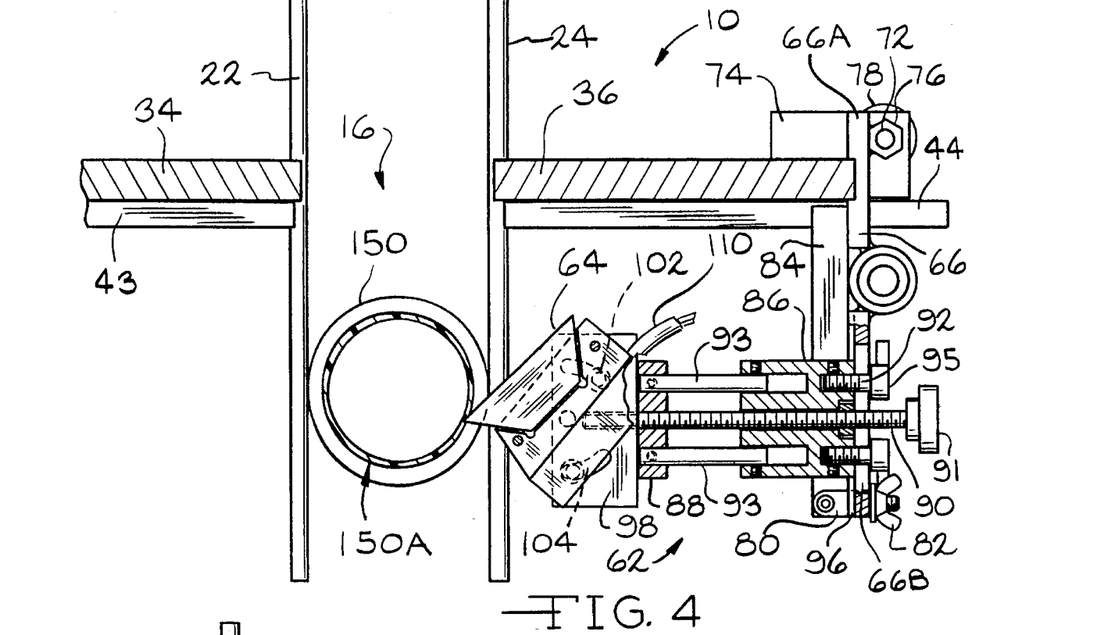
FIG. 4 is a partial cross-sectional top view of the apparatus 10 below the wheels 12 and 14 through the knife assembly 62 showing the positioning of the knife blade 64 in the notch 150A of the bottle 150 during cutting.
Figure 5:
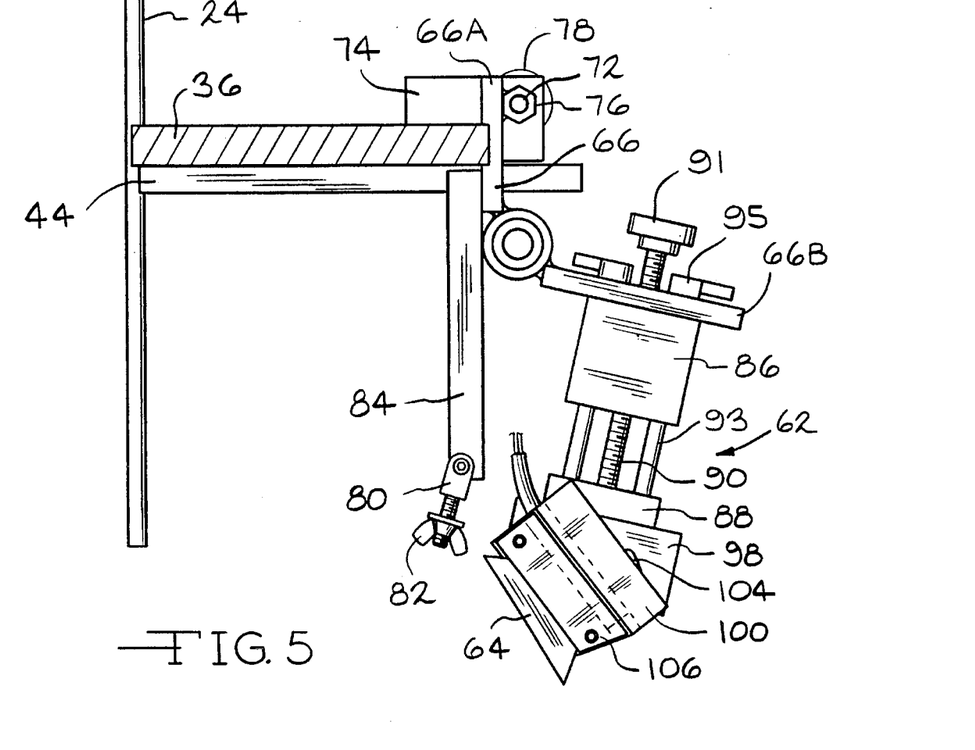
FIG. 5 is a partial cross-section top view above the knife assembly 62 showing the knife assembly 62 in the disengaged position.

A knife assembly 62 is pivotably mounted beneath one of the wheels 12 or 14 such that in the cutting position, the knife blade 64 of the knife assembly 62 extends into the path 16 between the wheels 12 and 14 slightly in front of the area where the bottle 150 is tangent with both wheels 12 and 14 (FIG. 4). Preferably, the knife assembly 62 is mounted beneath the advancement wheel 12 on the right side of the apparatus 10 (FIG. 1). In the preferred embodiment, the point of the knife blade 64 is slightly in front of the point where the bottle 150 is tangent with the wheels 12 and 14. For instance, with a bottle 150 having a notch 150A with a diameter of 2½ inches (6.35 cm) the point of the knife blade 64 is positioned 0.534 inches (1.36 cm) from the center of the tangent point toward the exit guide rail 112. The knife assembly 62 includes a hinged holder 66 having a slidable portion 66A and a pivotable portion 66B. The slidable portion 66A of the holder 66 is mounted onto the outer edge of the right mounting plate 36 opposite the path 16 of the apparatus 10 (FIGS. 3 to 5). The slidable portion 66A is mounted by a bolt (not shown) extending through a vertical slot (not shown) in the slidable portion 66A and into the mounting plate 36. The vertical slot allows the holder 66 to be adjusted vertically in relation to the wheels 12 and 14. The holder 66 is adjusted by a threaded rod 72 which extends through a support 74 mounted to the mounting plate 36 and into a nut 76 attached to the holder 66. The threaded rod 72 is provided with a handle 78 on the end opposite the nut 76. Rotating the handle 78 causes the holder 66 to move up or down which causes the knife assembly 62 and thus, the knife blade 64 to be able to be adjusted vertically with respect to the path 16 and the bottle 150. This allows for bottles 150 having different sized dome scrap 152 or different length necks or bodies to be trimmed in the apparatus 10. The pivotable portion 66B of the holder 66 is locked into position by a pivotable lock 80 with a wingnut tightener 82. The pivotable lock 80 is mounted on a stationary bar 84 which extends outward perpendicular to the mounting plate 36 beneath the wheel 12. The lock 80 is mounted on the end of the bar 84 opposite the mounting plate 36. To lock the holder 66 in the cutting position, the pivotable portion 66B of the holder 66 is pivoted parallel to and adjacent to the stationary bar 84 extending perpendicular to the mounting plate 36. The pivotable lock 80 is then pivoted into a notch 96 in the pivotable portion 66B of the holder 66 and the wingnut tightener 82 is tightened to secure the holder 66 in place (FIG. 4). To move the holder 66 into the disengaged position, the wingnut tightener 82 is loosened and the pivotable lock 80 is pivoted out of the notch 96 in the holder 66 (FIG. 5). The holder 66 is then free to pivot. The knife assembly 62 also has an expansion block 86 with a movable extension 88. The expansion block 86 is slidably mounted in an indentation on the inside surface of the pivotable portion 66B of the hinged holder 66. The indentation enables the expansion block 86 to be more securely mounted on the holder 66. The expansion block 86 is mounted perpendicular to the holder 66 by bolts 92 which extend through slots (not shown) in the holder 66 and into the expansion block 86. The bolts 92 do not extend into the extension 88. The bolts 92 are provided with handles 95 adjacent the holder 66. The handles 95 allow for easy loosening of the bolts 92 to enable the expansion block 86 to be moved horizontally along the inside of the pivotable portion 66B of the holder 66. The inside surface of the pivotable portion 66B can be provided with a measuring device (not shown) to accurately position the expansion block 86 on the holder 66. A threaded rod 90 having a knob 91 at one end extends through the entire expansion block 86 including the extension 88 and allows for moving the extension 88 toward and away from the remainder of the expansion block 86. The threaded rod 90 is positioned between and parallel to a pair of extension rods 93 which are mounted concentrically with the bolts 92 and which extend completely through the extension 88 and into the remainder of the block 86 and which stop adjacent to the ends of the bolts 92 opposite the handles 95. The expansion block 86 can be provided with a measuring device (not shown) in order to determine the distance the block 86 which has been expanded. The extension 88 of the block 86 extends above the remainder of the expansion block 86 to allow for mounting of the pivot block 98 (to be described in detail hereinafter) on the expansion block 86 without interfering or blocking the rods 93 or threaded rod 72. A pivot block 98 is mounted adjacent the top of the extension 88 on the side opposite the holder 66. A knife holder 100 is mounted on the pivot block 98 and is secured in place by a pair of nut and bolt assemblies 102 which mount through the knife holder 100 and into curved slots 104 in the pivot block 98. The curved slots 104 allow the angle of the knife holder 100 and thus, the knife blade 64 to be varied with respect to the path 16 of the apparatus 10. The knife holder 100 has a pocket (not shown) in its upper surface opposite the pivot block 98 into which the knife blade 64 is mounted. The knife blade 64 is held in place in the pocket of the knife holder 100 by a top plate 106 which is removably secured over the top of the knife blade 64 and into the knife holder 100. The various adjustments of the knife blade 64 are necessary to accommodate bottles 150 of different sizes and shapes, constructed of different types of plastic and having different diameter openings. In addition, adjustment of the knife blade 64 is necessary to provide smooth cuts for any depth notch 150A in the bottle 150. The knife blade 64 can also be provided with a heater 110. In the preferred embodiment, the heater 110 is an electric heater which is mounted within the knife holder 100. A heater 110 is necessary to obtain a smooth cut in certain types of plastic and to make some types of plastic easier to cut.

As shown in FIGS. 2 and 3, the trimming apparatus 10 also includes a curved exit guide rail 112 at the same height as the upper guide rails 18 and 20 and the wheels 12 and 14. The exit guide rail 112 carries the removed dome scrap 152 out of the linear path 16 between the wheels 12 and 14, along the advancement wheel 12 to a dump site where the dome scrap 152 is then recycled for reuse. One end of the exit guide rail 112 is secured to a post 114 adjacent the rotation wheel 14 while the other end of the rail 112 is mounted to an adjustable bar 116 positioned adjacent the advancement wheel 12 (FIG. 3). The adjustable bar 116 is able to be moved toward or away from the advancement wheel 12 and to be moved toward and away from the path 16. Each adjustment changes the curvature of the exit path rail 112 and thus the width and curvature of the exit path 16. In the preferred embodiment, the exit guide rail 112 is constructed of a flexible material such as plastic tubing, which allows the rail 112 to be easily adjusted to accommodate dome scrap grooves 152A having different diameters without having to replace the rail 112. Alternately, a lower exit guide rail (not shown) could be used to move the bottle 150 away from the path 16 once the dome scrap 152 has been removed.

IN USE

In the preferred embodiment, the trimming apparatus 10 is positioned in line with a conveyor having blow molded plastic bottles 150 containing dome scrap 152. The apparatus 10 is positioned such that the path 16 between the wheels 12 and 14 is horizontal and the upper guide rails 18 and 20 are aligned on either side of the groove 152A of the dome scrap 152 between the upper and lower portions 152B and 152C of the dome scrap 152. The conveyor can extend completely under and past the trimming apparatus 10 and thus, can carry the bottles 150 completely through the apparatus 10. In that instance, the horizontal bar and the guide plate would not be necessary. Alternately, the bottles 150 can be hand fed into the trimming apparatus 10 which would use the horizontal bar and guide plate. In either instance, the bottle 150 is positioned on the upper guide rails 18 and 20 such that the guide rails 18 and 20 are on either side of the groove 152A and thus, support the bottle 150. The bottle 150 is then hand moved or conveyed along the upper guide rails 18 and 20 and into contact with the wheels 12 and 14.

As the bottle 150 moves along the upper guide rails 18 and 20, the shorter length of the right upper guide rail 20 adjacent the advancement wheel 12 ensures that the bottle 150 is moved into the trimming apparatus 10 before the bottle 150 begins to rotate. By moving the bottle 150 into the apparatus 10 before the start of rotation, the body of the bottles 150 in the path 16 have less tendency to collide with the adjacent bottles 150 as the bottles 150 are only rotating for a short duration. This is especially important where the body of the bottle 150 is not round or cylindrical or where the circumferencial size of the body of the bottle 150 is larger than the neck of the bottle 150. This is also important where the bottles 150 are slightly unsteady or wobbly during or prior to their initial engagement with the wheels 12 and 14. The hard covering 60 on the wheels 12 and 14 or alternately, the outer surface of the wheels 12 and 14 also prevents wobbling of the bottles 150 in the apparatus 10 due to the stationary, solid and non-flexible path 16 formed by the guide rails 18 and 20 and the wheels 12 and 14. As soon as the bottle 150 moves into the area tangent to the wheels 12 and 14 or slightly before the tangent area, the rotation wheel 14 engages the groove 152A of the dome scrap 152 and the bottle 150 begins to rotate. As soon as the bottle 150 is in the tangent area and begins to rotate, the knife blade 64 begins to cut into the notch 150A to sever the dome scrap 152 from the bottle 150. Preferably, the rotation wheel 14 is only in contact with the groove 152A of the dome scrap 152 long enough to completely rotate the bottle 150 360° against the knife blade 64. In the preferred embodiment, the rotation wheel 14 engages the groove 152A of the dome scrap 152 at the same time or slightly before the knife blade 64 first makes contact with the notch 150A. Preferably, contact of the knife blade 64 with the notch 150A is made when the bottle 150 is tangent with the two wheels 12 and 14.

The rate of rotation of the two wheels 12 and 14 is independently adjustable. The wheels 12 and 14 rotate in the same direction such that the engagement of the wheels 12 and 14 on the groove 152A of the dome scrap 152 is in opposite directions due to the position of the wheels 12 and 14 on opposite sides of the groove 152A. Preferably, the advancement wheel 12 moves at a greater rpm than the rotation wheel 14. The wheels 12 and 14 preferably rotate at speeds such that the speed of the advancement wheel 12 is five percent (5%) greater than the speed of the rotation wheel 14. In the preferred embodiment, a 160 rpm motor is used and the advancement wheel 12 operates at forty percent (40%) while the rotation wheel 14 operates at thirty-five percent (35%). Increasing the speed of the rotation wheel 14 causes the bottle 150 to advance through the trimming apparatus 10 slower.

Once the dome scrap 152 has been removed, the dome scrap 152 is moved out of the trimming apparatus 10 using the advancement wheel 12 to move the dome scrap 152 along the curved exit guide rail 112. In the preferred embodiment, the bottle 150 advances continuously forward through the trimming apparatus 10 without a pause even during contact with the knife blade 64. Once the dome scrap 152 is removed, the finished bottle 150 continues to move on the conveyor (not shown) or if the apparatus 10 is hand fed, the bottle 150 will fall onto the guide plate, if used, or will fall into a bin (not shown) below the apparatus 10. Alternatively, the dome scrap 152 can drop when removed and the bottle 150 can be carried away along a lower exit guide rail.

The distance between the wheels 12 and 14 and the upper guide rails 18 and 20 can be adjusted to accommodate different sized dome scrap grooves 152A. The wheels 12 and 14 and rails 18 and 20 can also be adjusted vertically for different height bottles 150. The entire height of the apparatus 10 can also be adjusted on the frame 200 to accommodate different conveyor systems and different blow molding systems. In addition, the apparatus 10 is able to be rotated on the back plate 38 which changes the angle of the entire apparatus 10 with respect to a horizontal ground surface. By adjusting the angle of the entire apparatus 10, bottles 150 having an angled neck can be descraped.

The knife assembly 62 which is pivotably mounted to the right mounting plate 36 adjacent the advancement wheel 12, is able to be pivoted out of the path 16 of the trimming apparatus 10, when not in use or to allow for changing the knife blade 64. To pivot the knife assembly 62, the pivotable lock 80 is first loosened and pivoted such as to no longer be positioned in the notch 96 of the holder 66. The holder 66 is then able to be pivoted out from beneath the advancement wheel 12. This enables the user to easily replace the knife blade 64 without changing the adjustments of the knife assembly 62 or the wheels 12 and 14. The other adjustments of the knife assembly 62 enable the angle of the knife blade 64 to be changed, the depth of the knife blade 64 to be changed and the position of the knife blade 64 along the path 16 to be adjusted. For instance, the knife blade 64 would have to be positioned farther away from the tangent point between the wheels 12 and 14, as the diameter of the notch 150A or opening of the bottle 150 increased. The angle of the knife blade 64 can be adjusted for different types of plastics in order to obtain smooth cuts. Preferably, when removing the dome scrap 152 from a bottle 150 constructed from polyvinylchloride (PVC), the knife blade 64 has a shallower cut angle in order to obtain a smooth cut. In addition, the knife blade 64 would preferably be heated in order to make the knife blade 64 cut the PVC easier. Contrastly, if the bottle 150 is constructed of HDPE then the angle of the knife blade 64 should be steep. In addition, with a shallow notch 150A, the angle of the knife blade 64 would be shallow.

It is intended that the foregoing description be only illustrative of the present invention and that the present invention be limited only by the hereinafter appended claims.

I claim:

1. A trimmer apparatus for removing a dome scrap from a blow molded, plastic container, which comprises:

(a) a frame defining a path through the apparatus;

(b) conveying means for rotating the container consisting essentially of a single pair of opposed circular drive wheels positioned along the path on opposite sides of the path in a common plane, wherein each of the drive wheels is connected to a drive means mounted on the frame for rotating the drive wheels in the same directions and wherein the drive wheels acting together contacts the dome scrap and provides for rotating the container about a longitudinal axis of the container wherein one of the wheels acts to move the container and dome scrap along the path;

(c) a cutting means mounted adjacent at least one of the drive wheels with a cutting edge of the cutting means projecting into the path adjacent the longitudinal axis, away from the drive wheel to provide for cutting the dome scrap from the container as the container is rotated on the longitudinal axis in the path between the drive wheels so that the container falls away from the path; and (d) a guide means mounted adjacent the other one of the drive wheels for keeping the dome scrap in contact with the one of the drive wheels for moving the container and dome scrap along the path and for moving the dome scrap out of the path and along the other drive wheel after the dome scrap is removed.

2. The trimmer apparatus of claim 1 wherein the path between the drive wheels is a linear path.

3. The trimmer apparatus of claim 2 wherein the drive means are mounted on spaced apart first and second plates supported on opposite sides of the path, and wherein the spaced apart plates are connected together by an adjustment means supported by a holder means which provides for adjusting the distances between the plates and drive wheels.

4. The trimmer apparatus of claim 3 wherein the adjustment means is provided by a threaded rod having opposed right and left handed threads and mounted through the holder means supported by the plates and wherein the plates are moved together and apart by rotating the rod.

5. The trimmer apparatus of claim 2 wherein the drive means causes the drive wheels to rotate in a similar direction so that one of the drive wheels rotates in a forward direction, and the other drive wheel rotates in a backwards direction with respect to the path, and wherein the drive wheel rotating in the forward direction is rotating at a faster rate than the other drive wheel which acts to rotate the container about the longitudinal axis as the container moves along the path.

6. The trimmer apparatus of claim 5 wherein the drive wheels contact a groove between spaced apart annular enlarged portions of the dome scrap to rotate the container and wherein the cutting means cuts along a notch provided below a lower of the annular enlarged portions to sever the dome scrap from the container.

7. The trimmer apparatus of claim 6 wherein the drive wheels are spaced apart a distance less than a diameter of the groove of the dome scrap so that the drive wheels cause the groove and the notch to become elliptical when the dome scrap is between the drive wheels.

8. The trimmer apparatus of claim 7 wherein the cutting means cuts along a long side of the notch.

9. The trimmer apparatus of claim 1 wherein the frame is provided with a roller means for horizontal movement of the frame.

10. The trimmer apparatus of claim 1 wherein an angle of the cutting means in the path is horizontally adjustable to change an angle of cut into the dome scrap.

11. The trimmer apparatus of claim 1 wherein the cutting means is heated by an electrically actuated heating means connected to the cutting means.

12. The trimmer apparatus of claim 1 wherein the cutting means has a sharp, pointed edge.

13. The trimmer apparatus of claim 1 wherein the cutting means is mounted at a distance spaced below the drive wheels and the distance is vertically adjustable and wherein the cutting means is adjustable horizontally to change a depth of cut into the dome scrap.

14. The trimmer apparatus of claim 1 wherein a guide means is mounted on the frame and serves to hold the longitudinal axis of the container in a vertical position as the container is moved along the path before the container is rotated by the drive wheels.

15. The trimmer apparatus of claim 14 wherein the guide means includes a pair of rails which engage a rail groove provided between two spaced apart annular, enlarged portions comprising the dome scrap of the container.

16. The trimmer apparatus of claim 15 wherein each of the rails is mounted adjacent and aligned with an outer circumference of each of the drive wheels.

17. The trimmer apparatus of claim 16 wherein an end of one of the rails is spaced apart from the outer circumference of the adjacent drive wheel a distance less than a distance between an end of the other rail and the outer circumference of the adjacent other drive wheel.

18. The trimmer apparatus of claim 17 wherein the drive wheel which makes contact with the container first, advances the container along the path and wherein the drive wheel which makes contact with the container second, acts together with the other drive wheel to rotate the container.

19. The trimmer apparatus of claim 1 wherein the removal means is comprised of a flexible rail mounted to the frame and adjacent at least one of the drive wheels so that the dome scrap can be removed and carried away from the path.

20. The trimmer apparatus of claim 1 wherein the drive wheels have a covering around an outer circumference for preventing damage to the container while in contact with the drive wheels.

21. The trimmer apparatus of claim 20 wherein the covering is constructed of plastic.

22. The trimmer apparatus of claim 1 wherein the drive wheels have an abrasive surface on their outer circumference to prevent slippage of the container while in contact with the drive wheels.

23. The trimmer apparatus of claim 1 wherein at least one of the drive wheels has a notched surface on its outer circumference to prevent slippage of the container while in contact with the drive wheels.

24. The trimmer apparatus of claim 1 wherein the drive wheels have the same diameter.

25. The trimmer apparatus of claim 24 wherein the drive wheels rotate at an rpm between about 10 and 167.

26. The trimmer apparatus of claim 1 wherein there is a separate drive means for each drive wheel.

27. The trimmer apparatus of claim 1 wherein the path is horizontal to a ground surface.

28. The trimmer apparatus of claim 1 wherein an angle of the path with respect to a ground surface is adjustable.

29. A trimmer apparatus for removing a dome scrap from a blow molded, plastic container which comprises:

(a) a frame defining a path through the apparatus;

(b) a conveying means for conveying and rotating the container consisting essentially of:

(i) a first circular drive wheel positioned along the path, wherein the first drive wheel has a drive means mounted on the frame for moving the first drive wheel;

(ii) a second circular drive wheel positioned along the path, wherein the second drive wheel is connected to a drive means which provides for rotating the second drive wheel in the same direction as the first drive wheel; wherein the second drive wheel acts to move the container and dome scrap along the path and wherein the second drive wheel in conjunction with the first drive wheel contacts the dome scrap and provides for rotating the container about a longitudinal axis of the container while the container is in contact with the drive wheels;

(c) a cutting means mounted adjacent at least one of the first or the second drive wheels with a cutting edge of the cutting means projecting into the path, adjacent the longitudinal axis away from the first or second drive wheel to provide for cutting the dome scrap from the container as the container is rotated between the first and second drive wheels to remove the dome scrap; and (d) a guide rail mounted adjacent the first drive wheel for keeping the dome scrap in contact with the second drive wheel for moving the dome scrap out of the path and along the second drive wheel after the dome scrap is removed.

30. A method for removing dome scrap from a plastic container, which comprises:

(a) providing a trimmer apparatus for removing a dome scrap from a blow molded, plastic container, which comprises: a frame defining a path through the apparatus; conveying means for rotating the container consisting essentially of a single pair of opposed circular drive wheels positioned along the path on opposite sides of the path in a common plane, wherein each of the drive wheels is connected to a drive means mounted on the frame for rotating the drive wheels in the same directions and wherein the drive wheels acting together contact the dome scrap and provide for rotating the container about a longitudinal axis of the container wherein one of the wheels acts to move the container and dome scrap along the path; a cutting means mounted adjacent at least one of the drive wheels with a cutting edge of the cutting means projecting into the path adjacent the longitudinal axis, away from the drive wheel to provide for cutting the dome scrap from the container as the container is rotated on the longitudinal axis in the path between the drive wheels so that the container falls away from the path; and a guide means mounted adjacent the other one of the drive wheels for keeping the dome scrap in contact with the one of the drive wheels for moving the container and dome scrap along the path and for moving the dome scrap out of the path and along the other drive wheel after the dome scrap is removed; and (b) feeding the container into the path so that the container moves along the path and the dome scrap is removed by the guide means and the other of the drive wheels.

* * * * *